United States Patent [19]

Burnette

[11] 4,032,395
[45] June 28, 1977

[54] FUEL LEAK DETECTION APPARATUS FOR GAS COOLED NUCLEAR REACTORS

[75] Inventor: Richard D. Burnette, San Diego, Calif.

[73] Assignee: General Atomic Company, San Diego, Calif.

[22] Filed: Oct. 7, 1974

[21] Appl. No.: 512,531

[52] U.S. Cl. .................. 176/19 LD; 176/19 R; 176/37; 250/380; 73/421.5 R

[51] Int. Cl.² ........................................ G21C 17/02

[58] Field of Search ............. 176/19 R, 19 LD, 37; 250/375, 380; 73/421.5 R, 421.5 A

[56] References Cited
UNITED STATES PATENTS

| | | | |
|---|---|---|---|
| 2,979,451 | 4/1961 | Pettinger | 204/193.2 |
| 3,300,388 | 1/1967 | Jerman et al. | 176/19 |
| 3,784,823 | 1/1974 | Kostic et al. | 176/19 R |
| 3,801,440 | 4/1974 | Apt, Jr. et al. | 176/19 LD |

Primary Examiner—Samuel W. Engle
Assistant Examiner—Ralph Palo
Attorney, Agent, or Firm—Fitch, Even, Tabin & Luedeka

[57] ABSTRACT

Apparatus is disclosed for detecting nuclear fuel leaks within nuclear power system reactors, such as high temperature gas cooled reactors. The apparatus includes a probe assembly that is inserted into the high temperature reactor coolant gaseous stream. The probe has an aperture adapted to communicate gaseous fluid between its inside and outside surfaces and also contains an inner tube for sampling gaseous fluid present near the aperture. A high pressure supply of noncontaminated gas is provided to selectively balance the pressure of the stream being sampled to prevent gas from entering the probe through the aperture. The apparatus includes valves that are operable to cause various directional flows and pressures, which valves are located outside of the reactor walls to permit maintenance work and the like to be performed without shutting down the reactor.

9 Claims, 3 Drawing Figures

FUEL LEAK DETECTION APPARATUS FOR GAS COOLED NUCLEAR REACTORS

The present invention generally relates to nuclear fuel leak detection systems and, more particularly, to a leak detection system for use with high temperature gas-cooled reactors.

The use of nuclear reactors for the generation of commercial electrical power has been increasing, due in part to the forecast of depletion of fossil fuel resources, and continuing increase in the knowledge of the design, construction and operation of such units.

While the commercial nuclear reactors that are currently operating are generally of the light water reactor type, such light water reactors have reached the point of diminishing returns with regard to technical and economic improvements. The high temperature gas-cooled reactors, commonly referred to as HTGR reactors, are being developed for the next phase of commercial utilization for the reason that this type of reactor is believed to have many advantages arising from its higher temperature, and therefore higher thermal efficiency, which not only improves performance, conserves fuel, lowers costs and permits the use of conventional turbo generating equipment, but also reduces the amount of fuel required to dissipate or remove waste heat. Moreover, the employment of a combination of graphite core structure and helium coolants contributes to important inherent safety factors, facilitates maintenance and helps to decrease fuel costs. These as well as other favorable considerations have resulted in additional research efforts being focused on its development and refinement.

The primary coolant circulating through a HTGR reactor is gas, rather than the liquid that is used in the light water reactors. The gas cooling provides flexibility in the selection and optimization of temperature, pressure and flow rate conditions and thereby represents an advantage over a liquid coolant. Moreover, there is the disadvantage of contending with a phase change, i.e., liquid to gas, as is generally the case with liquid coolants. Helium, or a predominantly helium mixture is preferred for the gas coolant because it is chemically inert, absorbs essentially no neutrons, does not contribute to the reactivity of the system and is readily available.

Since the helium gas circulates through conduits that pass through the nuclear reactor core, detection apparatus for measuring leakage of nuclear radiation is necessary. Accordingly, it is a primary object of the present invention to provide improved leakage detection apparatus for use in high temperature gas-cooled reactors which is efficient and can be maintained in operation without shutting down the reactor or creating a hazardous condition.

Another object of the present invention lies in the provision of a nuclear fuel leak detection system which has no valves or other moving parts located within the liner of the nuclear vessel but which is easily controllable to obtain periodic samples of the gaseous coolant that is used therein.

Other objects and advantages will become apparent upon reading the following detailed description, in conjunction with the attached drawings, in which.

Figure 1:
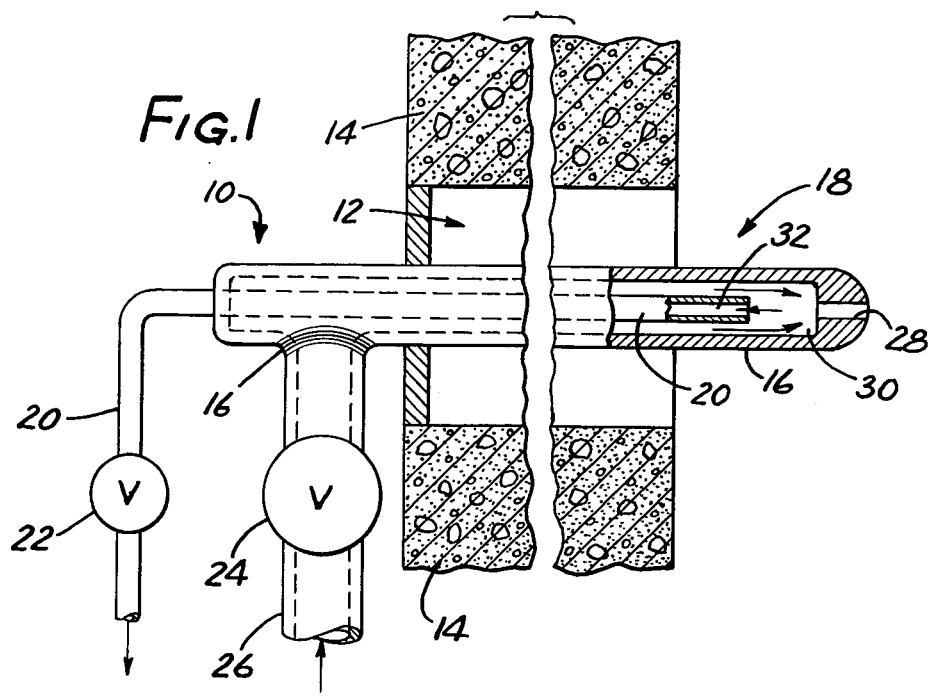
FIG. 1 is an idealized schematic view, partially in section, illustrating apparatus embodying the present invention.

Turning now to the drawings, and particularly FIG. 1, there is shown an idealized schematic diagram of apparatus embodying the present invention in its environment, and more particularly within a penetration of a prestressed concrete reactor vessel (PCRV) of a high temperature gas cooled nuclear reactor.

Broadly stated, the present invention is directed to a method and apparatus for measuring the concentration of gaseous radioactive iodine in the main gas coolant of a reactor, and particularly a high temperature gas cooled reactor. The apparatus does not require any valves inside the reactor primary containment and thereby eliminates the problem of mechanical malfunction of valves causing shut down of the reactor or the like. The apparatus permits a sample of the coolant gas to be withdrawn from inside the prestressed concrete reactor vessel through a charcoal bed located in an elongated probe that extends inside the reactor vessel. Gaseous iodine absorbs on the charcoal and the daughter xenon is then purged to a liquid nitrogen cooled counting trap at a reactor gas sampling station. The xenon gas normally in the coolant is prevented from entering the sample purge line by sweeping the inlet tip of the probe with high pressure helium supplied from an external source. As the gas is collected on the counting trap, the trap is radioassayed using standard gamma ray spectroscopic techniques. The concentration of iodine in the main coolant is then calculated using a variation of growth and decay of radioisotope equations.

More specifically, and referring to FIG. 1, apparatus embodying the present invention and indicated generally at 10 is shown positioned in a penetration 12 of a prestressed concrete reactor vessel 14 which may have a wall thickness of several feet. The penetrations 12 may be relatively small in diameter, i.e., only slightly larger than the diameter of the apparatus inserted therein, which may be only a fraction of an inch. The apparatus 10 preferably includes a T-shaped or comparable fitting 16 located outside of the penetration 12, an elongated probe assembly, indicated generally at 18, which is inserted into the gaseous stream of the coolant through the penetration 12, an inner tube 20 extending from near the end of the probe assembly 18 outwardly through the fitting 16 to a valve 22. Similarly, a valve 24 controls the flow of gas through conduit or tubing 26 which is larger than the tube 20 so as to permit flow therebetween. At the end of the tubing 26, that is inserted into the gaseous coolant stream, is an orifice 28 which communicates fluid from the outer surface thereof to an inner chamber 30. The tubing 20 has an open end 32 which is also immediately adjacent the chamber 30. Therefore, the chamber 30 is in direct communication with the orifice 28, the opening 32 of the tube 20 as well as the annular area between the tube 20 and the inside diameter of the conduit 26. Depending upon the relative pressures that are produced in each of these three possible flow paths, directional flow can be induced so as to selectively sample the gas coolant through the orifice 28 and thereafter block the flow by controlling the valves 22, 24 and the external supplies of gas connected to the conduits. As will hereinafter be more fully explained, the valve 24 preferably connects the probe assembly 18 to a high pressure source (not shown) through the conduit 26 so that when the valve 24 is opened, gaseous flow is produced toward the chamber 30 from between the tube 20 and the conduit 26. If the pressure exceeds the pressure of the gaseous coolant outside of the orifice 28, the flow through the orifice 28 into the chamber 30 will be stopped. In this way, the flow through the orifice 28 can be selectively controlled to provide the desired samples for testing, all of which can be done without the presence inside the reactor vessel of valves or other devices which could experience a mechanical malfunction. Since all of the controllable elements, namely the valves 22 and 24, the source of high pressure gas (not shown), but connected to the conduit 26 are all outside of the penetration 12, the maintenance of the detection apparatus can be easily performed without having to shut down the reactor.

Figure 2:
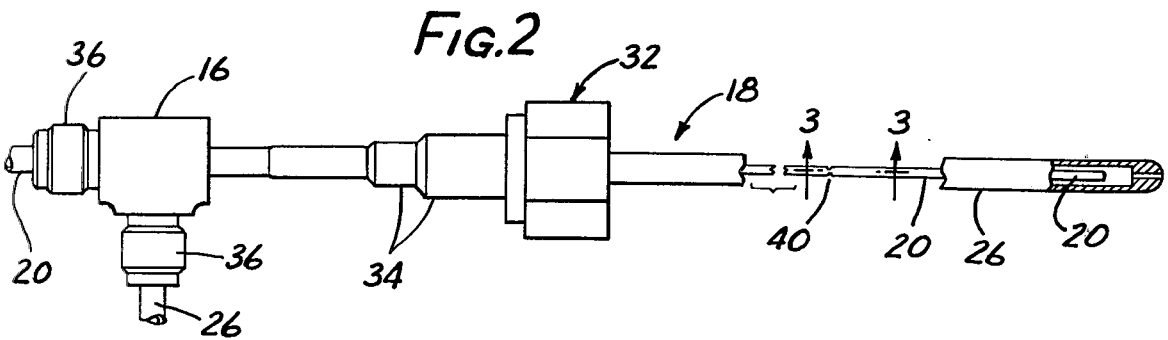
FIG. 2 is a side view of portions of the present invention, shown with portions removed and partially in section.
Figure 3:
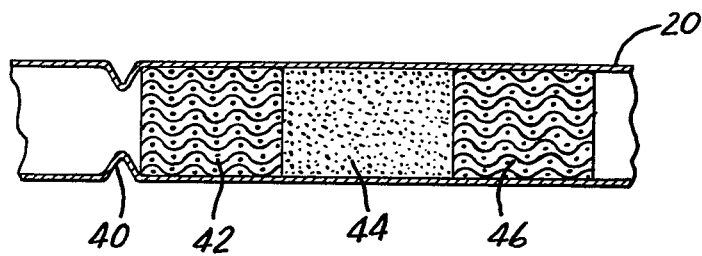
FIG. 3 is an enlarged cross-section of a portion of the apparatus shown in FIG. 2 and is taken generally along the lines 3—3.

Turning to a more detailed illustration of the idealized apparatus of FIG. 1, and referring to FIGS. 2 and 3, the probe assembly 18 having the inner and outer conduits 20 and 26 are shown partially in section and with portions removed in FIG. 2, with an enlarged cross-section of the small length of the tube 20 being particularly illustrated in FIG. 3. The probe assembly 18 has a coupling assembly, indicated generally at 32, for attachment to a suitable plate or the like to provide a barrier to the reactor where the penetration is located. It should be understood that the thickness of the walls of a prestressed concrete reactor vessel may approach or exceed ten feet and, accordingly, the probe assembly may be on the order of 12 to 14 feet in length, depending upon the thickness of the vessel wall and the depth of penetration of the probe within the reactor coolant and the like. The apparatus may be provided with reducers 34 adjacent the coupling assembly 32 which are connected to the fitting 16 by suitable connectors 36. While the specific connectors and other hardware shown in FIG. 2 may vary, the directional flow patterns shown in the schematic illustration of FIG. 1 are maintained as hereinbefore described. Referring to the enlarged cross-sectional view shown in FIG. 3, the tube 20 is shown to include a constriction or reduced diameter portion 40 which is adapted to provide a barrier against movement by a spiral wound screen element 42 that is positioned therein. The spiral wound screen element 42 provides a barrier to a bed of charcoal 44 and another screen element 46 is positioned on the opposite side thereof. The screen elements are adapted to permit gaseous flow through the charcoal bed 44 while holding the charcoal particles so that they do not migrate with the flow of gas. While the cylindrically shaped, spiral wrapped screen elements are specifically illustrated in the embodiment of FIG. 3, it should be understood that other suitable materials may be used, provided that they permit the gaseous flow therethrough and provide a barrier to retain the bed of charcoal in place.

Turning to the sample collection and counting test procedure, the probe assembly 18 allows the reactor coolant gas, which is preferably helium, to flow through the small orifice 28, into the chamber 30, through the opening 32 into the tube 20 where the iodine is adsorbed in the charcoal bed 44. When the flow is in this direction, the valve 24 is shut off or closed, while the valve 22 is opened so that the flow is through the orifice 28 substantially directly into the opening 32 of the tube 20. After sufficient iodine has accumulated in the charcoal bed 44, the valves 22 and 24 are adjusted so that flow through the orifice 28 is blocked and substantially pure, clean helium is fed from the external source through conduit 26 and valve 24 to the chamber 30 and into the opening 32 of the tube 20. This enables the daughter product xenon from precursor iodine to be purged into a dry ice-alcohol chilled charcoal xenon collection trap (not shown) for gamma counting.

More specifically, the technique involves the steps of accumulating iodine on the charcoal absorption bed 44 for a given time $t_1$ and at a controlled flow rate F, thereafter purging the absorption bed inlet orifice 32 with clean high pressure helium and collecting xenon gas in the dry ice-alcohol chilled charcoal xenon collection trap located at the sampling station (not shown but downstream of the valve 22) for a given time $t_2$, taking a gamma count of the xenon collection trap using standard gamma spectrometry techniques. The iodine monitor charcoal adsorption bed 44 should be essentially free of iodine from any prior tests, with the time varying in relation to the particular isotope of iodine being monitored. For example, the measurement of I-135 could be repeated every other day if desired, since two days would allow complete decay of the 6.7 hour I-135 iodine which would be accumulated on the charcoal bed. If decay periods of several days are allowed between samplings, then both 6.7 hour I-135 and 21 hour I-133 iodine can be monitored. Samples of the purge gas for radioassay of xenon would be accumulated in a dry icealcohol chilled charcoal trap preferably located at the radioactive gas sample station. It should also be understood that after sufficient iodine has accumulated on the charcoal absorption bed 44, and the valve 24 is opened to permit the flow of pure helium to purge through the outer conduit 26 and outwardly through the orifice 28 to thereby block the inward flow, the gas flow through the charcoal bed and to the gas sampling station is also maintained. The flow through the orifice 28 is preferably relatively large compared to the flow through the sample in the bed 44 so that the daughter product xenon from precursor iodine is purged to the sample station without being contaminated by xenon which is normally in the reactor coolant. It may also be desirable to construct the orifice 28 of a material that is relatively non-absorbing vis-a-vis iodine, to insure that iodine will not hold up in the inlet orifice and detrimentally affect the accuracy of the technique.

In keeping with the present invention, the concentration of the iodine, can be found using the following relationship:

$$C_I = \frac{Xc\ \lambda_1(\lambda_2 - \lambda_1)}{F\ \lambda_2(e^{-\lambda_1 t_2} - e^{-\lambda_2 t_2})(1 - e^{-\lambda_1 t_1})}$$

where $C_I$ is the iodine concentration in helium gas is microcuries per cubic centimeter, Xe is the xenon collected in the charcoal trap in microcuries, F is the iodine collection flow rate in cubic centimeters of helium per second, $\lambda_1$ is the decay constant I-135 or I-133, $\lambda_2$ is the decay constant of xenon-135 or xenon-133, $t_1$ is the iodine collection time in seconds, and $t_2$ is the xenon collection time in seconds. The sensitivity of the method or technique improves with longer iodine and xenon collection times, $t_1$ and $t_2$.

Thus, with the apparatus of the present invention, an effective iodine monitoring technique is provided that utilizes a probe assembly for taking gas samples of the helium gas coolant in a nuclear reactor, but which has no moving parts or equipment within the reactor vessel that are capable of malfunctioning so as to necessitate shutting down the reactor to repair or replace the same. Since the probe assembly that is inserted within the penetration merely operates on the principle of differential pressures and directional flow which may be controlled by valves and supplies outside of the penetration, a malfunction of the apparatus can only occur in the equipment outside of the reactor vessel, thereby enabling maintenance and repair work to be easily accomplished.

It should be understood that although preferred embodiments of the present invention have been illustrated and described, various modifications thereof will become apparent to those skilled in the art, and, accordingly, the scope of the present invention should be defined only by the appended claims and equivalents thereof.

Various features of the invention are set forth in the following claims.

What is claimed is:

1. Apparatus for use in the detection of gaseous radioactive iodine in the gaseous coolant of a nuclear reactor comprising:
   elongated probe means extending through a penetration of a reactor vessel to the gaseous coolant stream, said elongated probe being sealed to prohibit leakage of said coolant from between said probe and the penetration;
   said probe means having an outer generally cylindrically shaped wall, a conduit means positioned inside of said outer wall and defining a first passage adapted to communicate gaseous coolant therethrough, the area between said conduit means and said outer wall providing a second passage, said inner conduit means terminating adjacent the end of said probe means so as to define a reservoir, the outer wall of said probe means having an orifice therein for selectively communicating gaseous coolant from said stream to said reservoir in response to the relative pressures on opposite sides of said orifice;
   valve means adapted to selectively open and close said first and second passages to permit flow therethrough;
   said conduit means having an iodine absorption bed located therein adjacent the reservoir.

2. Apparatus as defined in claim 1 wherein first and second valves independently control flow through said first and second passages, the second passage being connected to an external high pressure supply so that opening of said second valve causes flow through said second passage into said reservoir, the pressure of said reservoir exceeding the pressure of said gaseous stream to thereby terminate inward flow through said orifice into said reservoir.

3. Apparatus as defined in claim 1 wherein said iodine absorption bed comprises a volume of activated charcoal with gas pervious barrier means positioned on opposite sides of said activated charcoal to prevent migration thereof as a result of gaseous flow therethrough.

4. Apparatus as defined in claim 3 wherein each of said barrier means comprises a spiral roll of screen material.

5. Apparatus as defined in claim 3 wherein said conduit means has a radially inwardly directed constriction adjacent one of said barrier means for preventing movement thereof relative to said conduit means in response to flow of fluid therethrough.

6. Apparatus for monitoring gaseous radioactive iodine in the gaseous coolant of a nuclear reactor, comprising:
   an elongated probe means having an outer wall and extending through a penetration of a nuclear reactor vessel into the coolant stream, the end portion of said probe having an orifice therein through which said gaseous coolant may enter interiorly thereof;
   said probe means having the gaseous conduit means positioned inside said outer wall and defining a first passage for communicating gas therethrough, the area between the outside of said conduit means and the inside of said outer wall defining a second passage for communicating the gaseous fluid therethrough;
   said conducting means terminating a predetermined distance from the end of said probe having said orifice so as to define a chamber therein, said end of said conduit means being open and in communication with said chamber;
   a radioactive iodine absorption bed being located within said conduit means adapted to absorb iodine therein;
   first and second valve means adapted to respectively control the flow through said first and second passages.

7. A method of drawing samples of a gas from a stream thereof comprising the steps of:
   opening the first valve controlling the flow of gas through a first tube located interiorly of a second tube and opening into a chamber that is in communication with the outside of said second tube through an orifice in said second tube, said orifice being located in communication with said stream being sampled, the opening of said first valve causing the gas to be sampled to pass through said orifice into said chamber and through said first gas tube and said first valve to a gas sampling station;
   opening a second valve to thereby admit high pressure gas from a source into a second passage extending through said chamber so as to communicate the high pressure gas to said chamber and thereby block the flow of incoming gas through said orifice, said high pressure gas flowing through said chamber into said first tube to thereby isolate said gas sampling station from said stream of gas.

8. A method as defined in claim 6 wherein said first passage includes a bed of iodine absorbing charcoal for accumulating a sufficient amount of iodine for measurements of radioactivity.

9. A method as defined in claim 6 wherein said high pressure gas is substantially comprised of helium and the pressure thereof is greater than the pressure of the gas being sampled at the outside of said probe means.

* * * * *